June 23, 1931.   O. BJORK   1,810,998
BACKSTOP FOR MOTOR VEHICLES
Filed April 28, 1930   2 Sheets-Sheet 1

INVENTOR:
O. Bjork
BY H. J. Sanders
ATTORNEY

June 23, 1931.  O. BJORK  1,810,998
BACKSTOP FOR MOTOR VEHICLES
Filed April 28, 1930   2 Sheets-Sheet 2
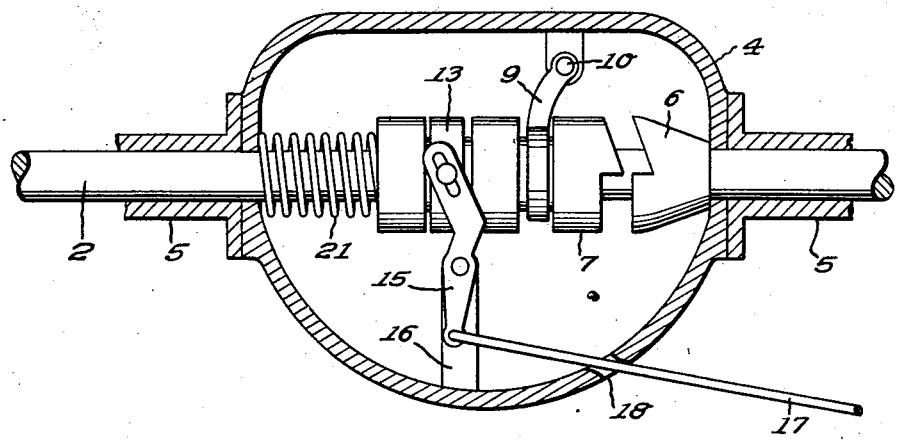
Fig. 4
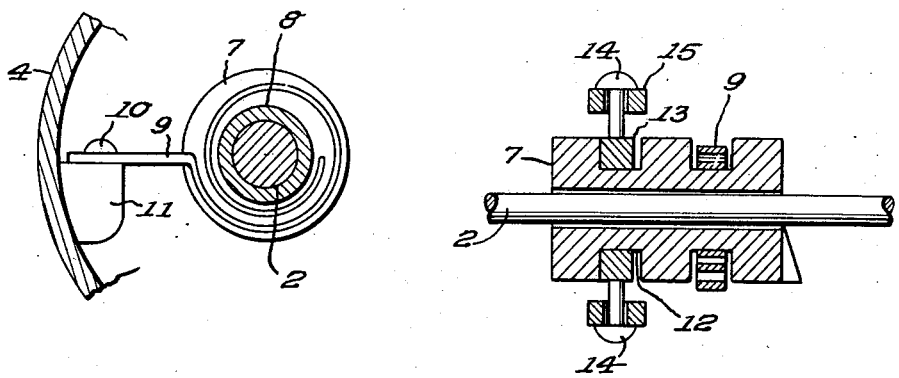
Fig. 5
Fig. 6
INVENTOR:
O. Bjork
H. J. Sanders
ATTORNEY Patented June 23, 1931

1,810,998

UNITED STATES PATENT OFFICE

OLOF BJORK, OF TAFT, BRITISH COLUMBIA, CANADA

BACKSTOP FOR MOTOR VEHICLES

Application filed April 28, 1930. Serial No. 447,977.

This invention relates to improvements in backstops for vehicles and more particularly for motor driven vehicles and its chief object is to provide means whereby to avoid the necessity of applying the brakes to prevent the vehicle from rolling backward when parked on an incline. With the foregoing and other objects in view the invention consists in the combination and arrangement of parts to be hereinafter fully described and illustrated in the accompanying drawings which form a part of this application for patent and in which—

Fig. 4 is a view similar to Fig. 2 but with the relatively movable parts in an altered position.

Fig. 5 is an enlarged vertical cross sectional view through Fig. 4.

Fig. 6 is a longitudinal sectional view through Fig. 4.

Like reference characters denote corresponding parts throughout the several views.

Figure 1:
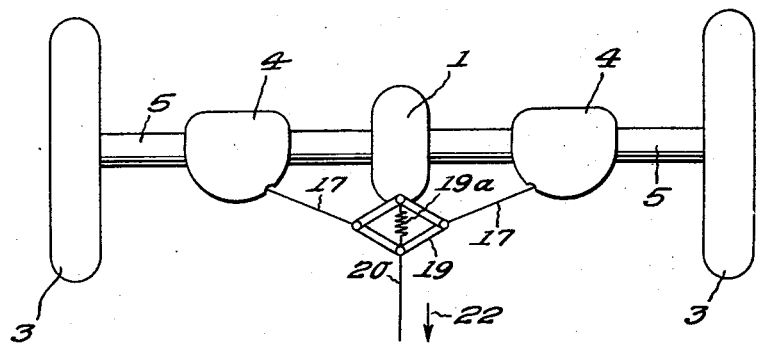
Fig. 1 is a plan view of the rear axle and wheels of a motor vehicle illustrating the application of the present backstop.

With the present general and increasing use of the stop and go lights for automobile traffic it is frequently necessary to make stops on inclines and ordinarily this requires applying the brakes to hold the car in parked position with the clutch out and the motor running. This makes starting of a forward movement of the car from a braked position necessary. This is inconvenient and difficult for many motorists and frequently causes jerky starting with the possibility of stalling the motor and delaying traffic or causing accidents.

It is the purpose of the present invention to relieve this situation by providing automatic means for preventing this "back rolling" without in any manner interfering with the backing up movement of the vehicle in the usual manner when desired.

Provision is made upon each side of the differential housing upon the driving axle for frictionally locking this axle against reverse rotation except at such times as it is desired to back the vehicle. As the mechanism upon both axle sections is identical a description of but one layout will be necessary in detail. The reference numeral 1 denotes the differential housing, 2 the rear drive axle and 3 the rear wheels of the vehicle. Upon both sides of the differential a housing 4 is arranged and secured in position by the sleeve brackets 5, said housing and brackets receiving said axle as shown.

Keyed to the axle 2 is the clutch member 6 while the cooperating clutch member 7 is loose thereupon and is formed with a recessed portion 8 to receive the stout coiled spring 9 which at one end is pivotally connected by pin 10 to the support post 11 carried by the housing. The said clutch member 7 is formed also with an annular recess 12 for the collar 13 which is connected by the pins 14 to the forked lever 15 fulcrumed to the post 16 carried by the housing, said lever being connected by the rod 17, passing through a perforation 18 in the housing, to the resilient equilateral frame 19 having its sides pivotally connected and provided with contractile spring 19a and that is secured to the differential housing 1, a rod 20 also connecting said frame being actuated by a hand lever or foot pedal (not shown) in easy reach of the operator or driver of the vehicle.

Figure 2:
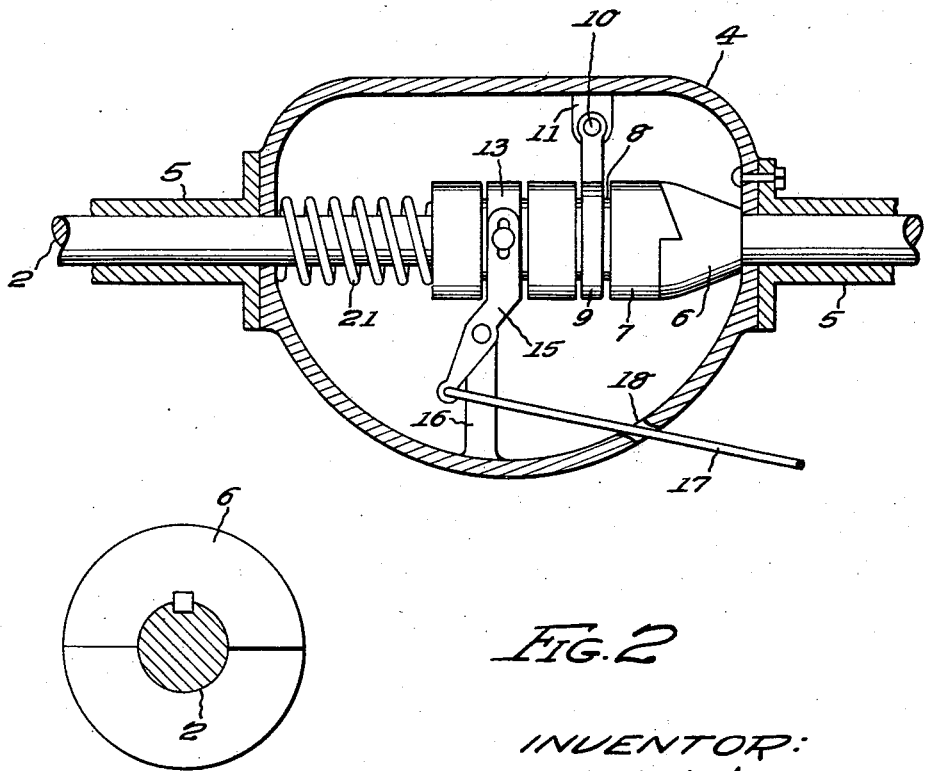
Fig. 2 is an enlarged fragmentary sectional view of Fig. 1.
Figure 3:
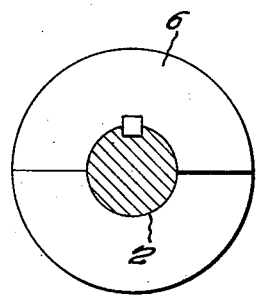
Fig. 3 is a cross sectional view through Fig. 2.

Loose upon the axle 2 between one end of the clutch member 7 and the adjacent end of the housing 4 is a strong coil spring 21 that yieldingly forces the clutch member 7 into engagement with the cooperating clutch member 6 as shown in Fig. 2. While the axle 2 is rotating forwardly the spring 9 will exert no binding action but a reverse rotary movement of said axle will cause the spring to bind about the clutch member 7 and to lock the clutch against such movement thus preventing a reverse or backing movement of the vehicle.

When it is desired to back the vehicle the operator moves his lever or pedal to cause movement of the rod 20 in the direction of the arrow 22, Fig. 1, thus moveing the clutch member 7 out of engagement with the member 6 or into the position shown in Fig. 4. The spring 9 will not now prevent rotation of the driving axle as the clutch member 6 may rotate with the axle independently of the clutch member 7.

What is claimed is:—

1. A backstop for motor driven vehicles comprising, in combination with the driving axle, housings arranged upon and receiving said axle upon opposite sides of the differential housing, a clutch comprising a clutch member keyed to said axle and a clutch member loose upon said axle in each housing, expansion coil springs upon said axle abutting said housings and said loose clutch members, a coil spring pivotally supported at one end and encircling said loose clutch member, a resilient frame supported between said housings, connection between said spring and loose clutch members, and manually operable means for actuating said resilient frame.

2. A backstop for motor driven vehicles comprising, in combination with the driving axle, housings arranged upon the opposed axle sections, clutch members in said housings, one clutch member being keyed to each axle section, a spring connecting each loose clutch member and its housing for yieldingly retaining the clutch members in engaged relation, a coil spring pivotally supported and encircling said loose clutch member, a quadrilateral frame having its sides pivotally connected disposed between said housings, connection between said frame and said loose clutch members, a contractile spring connecting two of the pivotal points in said frame, and manually operable means for flexing said frame.

3. A backstop for motor driven vehicles comprising, in combination with the driving axle, housings arranged upon the opposed axle sections, clutch members in said housings, one clutch member being keyed to each axle section, a spring connecting each loose clutch member and its housing end for yieldingly retaining the clutch members in engaged relation, a coil spring pivotally supported and encircling said loose clutch member, and manually operable means disposed between said housings and connecting said loose clutch members whereby they may be disengaged from said keyed clutch members.

4. A backstop for motor driven vehicles comprising, in combination with the driving axle, housings arranged upon the opposed axle sections, clutch members in said housings, one clutch member being keyed to each axle section, a spring connecting each loose clutch member and its housing end for yieldingly retaining the clutch members in engaged relation, pivotally supported springs encircling said loose clutch members, and manually operable means supported between said housings and connecting said loose clutch members whereby they may be disengaged from said keyed clutch members.

In testimony that I claim the foregoing as my own I have hereto affixed my signature.

OLOF BJORK.